UNITED STATES PATENT OFFICE.

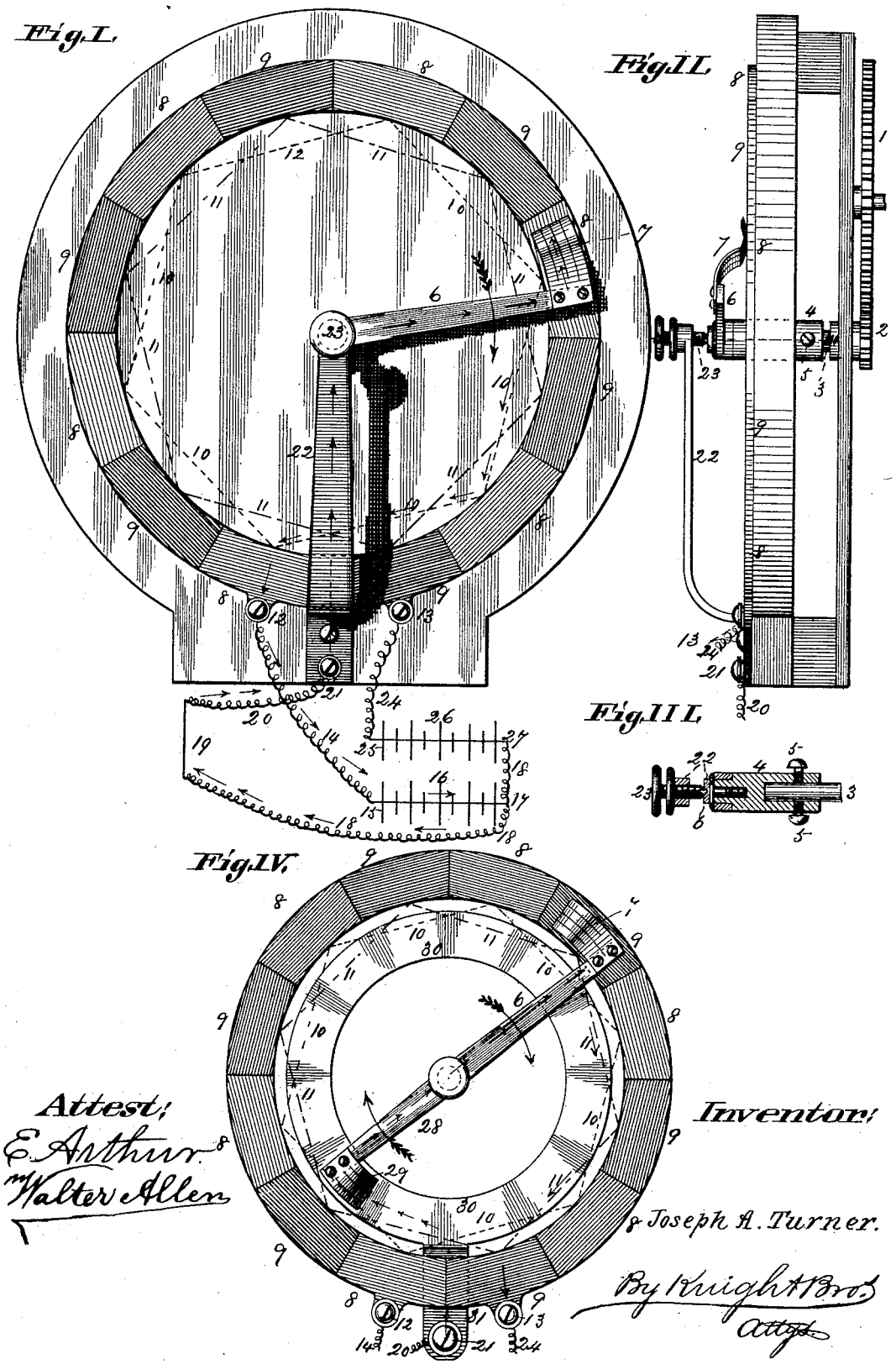

JOSEPH A. TURNER, OF ST. LOUIS, MISSOURI, ASSIGNOR TO CHARLES E. TURNER, OF SAME PLACE.

SWITCH DEVICE FOR ELECTRIC CURRENTS.

SPECIFICATION forming part of Letters Patent No. 400,808, dated April 2, 1889.

Application filed March 5, 1888. Serial No. 266,182. (No model.)

*To all whom it may concern:*

Be it known that I, JOSEPH A. TURNER, of the city of St. Louis, in the State of Missouri, have invented a certain new and useful Improvement in Switch Devices for Electric Currents, of which the following is a full, clear, and exact description, reference being had to the accompanying drawings, forming part of this specification.

This is a device to transfer the electric current from one galvanic battery to another, or to a number of batteries in continuous order.

In the drawings two batteries are shown, which are worked alternately, each being in action half the time and at rest half the time. Any number of batteries may, however, be used, and the time each battery is in operation may be as desired.

Figure I is an elevation of one form of the apparatus, the galvanic batteries being shown by diagram. Fig. II is a side elevation of the same. Fig. III is a section at III III, Fig. II. Fig. IV is a front elevation showing changes in parts of the mechanism.

At 1 and 2 are shown cog-wheels, which form part of a clock mechanism, and have continuous rotation.

3 is the shaft of the pinion 2. This shaft may be the shaft carrying either the minute or hour hand of a clock, so as to have an hourly rotation or rotation in twenty-four hours.

4 is a block, of hard rubber or other insulating material, having an axial socket in which the shaft 3 fits, and in which it is held by set-screws 5 or otherwise.

6 is an arm attached to the insulating-block 4, carrying at its end a brush, 7, which rubs against a circular series of metal plates, 8 and 9, mounted on a disk or other support, as the arm 6 moves around. The plates 8 and 9 are insulated from each other. Twelve of these plates are shown, the plates 8 and 9 being placed alternately. The plates 8 are all connected in series by the conducting-wires 10, and the plates 9 are similarly connected by the wires 11.

12 is a binding-screw upon one of the plates 8, and 13 is a similar screw on one of the plates 9.

14 is a conducting-wire connecting the binding-screw 12 (and consequently all the plates 8) with, say, the negative pole 15 of a galvanic battery, 16. The positive pole 17 of this battery is connected by a wire, 18, with an electric lamp or other electrical device at 19, through which a current of electricity must be passed.

20 is a conducting-wire leading from the light or point 19 to a binding-screw, 21, connected to the arm 6, thus completing the circuit. In one form (see Fig. I) this connection is made through a fixed arm, 22, carrying a center screw, 23, whose point rests in a center hole at axis of the revolving arm 6.

The binding-screw 13 is connected by a conducting-wire, 24, with, say, the negative pole 25 of the galvanic battery 26, whose positive pole 27 is in connection with the wire 18.

The arrows indicate the course of the electric current when the brush 7 is in contact with either of the plates 8, the current, which we will assume to be positive, passing from the binding-screw 12 along wire 14 to the battery 16, and wire 18 to the electric light or other thing 19, then along wire 20 to the arm 22, and along the revolving finger 6 to the plate 8, with which the brush may be in contact. When the brush comes in contact with one of the plates 9, the current from the binding-screw 13 passes along wire 24 to battery 26, and along wire 18 to the light, and along the course before described to the plate 9, with which the brush 7 may be in contact.

In Fig. IV the connection between the arm 6 and the binding-screw 21 is made by an arm, 28, having a brush, 29, in constant contact (as it revolves) with a circular plate, 30, said plate 30 and a projection, 31, carrying the binding-screw 21, connected to the said plate. It will be seen that the projection 31, circular plate 30, and arm 28, with its brush 29, take the place of the arm 22 and center (conducting) screw, 23, the course of the electric current being indicated by arrows.

It will be understood that the insulating-block 4 is to prevent the clock-works from becoming magnetic.

I have shown six of the plates 8 and a like number of the plates 9; but I do not confine myself to any particular number of them, for it is quite obvious that the essential principle of the invention would be present if only one of each of the plates 8 and 9 should be used, or any number of each of the plates.

It will be also seen that any number of galvanic batteries may be used, each battery being in connection with a single plate, 8 9, or with a series of such plates, so that the batteries shall be thrown into and out of operation. Thus if three batteries were used each battery would be at rest two-thirds of the time, and if four batteries were used each battery would be at rest three-fourths of the time and in use one-fourth of the time.

I claim—

1. In an electrical switch device, the combination of the rotating arm 6, brush on said arm, and circular series of plates connected successively with one pole of each of several batteries, with a conductor having electrical connection with the other poles of all the batteries, and an adjustable pivotal contact, 23, completing the circuit between said conductor and rotating arm, all substantially as and for the purpose described.

2. Two or more plates or series of plates arranged in a circle, each series of plates in electric connection together and with one pole of a galvanic battery and insulated from the plates of the other series, and a revolving arm in connection with the opposite poles of all the batteries to that with which the said plates are in connection, and having a brush carried by the revolution of the arm into and out of contact with the plates, for the purpose set forth.

3. The combination, with a disk having an annular series of closely-related insulated plates, electric batteries, each having one pole connected to one or to alternate ones of said plates, of a hand pivoted centrally in relation to the series of plates rotated by clock-work, adapted to contact with the plates successively, and having electrical connection with the remaining poles of all the batteries.

4. In a switch for electric batteries, the combination, with the frame or support and clock-work 2, mounted thereon, of shaft 3, rotated by clock-work 2, insulating-sleeve 4, carried by said shaft, arm 6, mounted on the sleeve and carrying brush 7, insulated plates 8 9, with which said brush is adapted to contact successively, connections between said plates and one pole of each of several batteries successively, arm 22, carrying screw 23, making pivotal electrical contact with arm 6, and electrical connection between the arm 22 and the other poles of all the batteries, as herein shown.

JOSEPH A. TURNER.

Witnesses:
SAML. KNIGHT,
EDWD. S. KNIGHT.